US008620986B2

(12) United States Patent
Wu et al.

(10) Patent No.: US 8,620,986 B2
(45) Date of Patent: Dec. 31, 2013

(54) PEER-TO-PEER NETWORK CONNECTIVITY STATUS

(75) Inventors: Wei Wu, Coppell, TX (US); James Earl Womack, Bedford, TX (US)

(73) Assignee: Blackberry Limited, Ontario ( * ) Notice: Subject to any disclaimer, the term of this patent is extended or adjusted under 35 U.S.C. 154(b) by 367 days.

(21) Appl. No.: 12/731,138

(22) Filed: Mar. 24, 2010

(65) Prior Publication Data

US 2011/0238794 A1    Sep. 29, 2011

(51) Int. Cl.
*G06F 15/173*    (2006.01)
(52) U.S. Cl.
USPC .......................... 709/200; 709/227; 370/311
(58) Field of Classification Search
None
See application file for complete search history.

(56) References Cited

U.S. PATENT DOCUMENTS

| | | | |
|---|---|---|---|
| 6,697,649 B1 * | 2/2004 | Bennett et al. | 455/574 |
| 7,797,429 B2 * | 9/2010 | Liang et al. | 709/227 |
| 2002/0090949 A1 | 7/2002 | Stanforth | |
| 2002/0099634 A1 * | 7/2002 | Coutts et al. | 705/35 |
| 2004/0125776 A1 | 7/2004 | Haugli et al. | |
| 2007/0057767 A1 | 3/2007 | Sun et al. | |
| 2008/0002675 A1 | 1/2008 | Li et al. | |
| 2008/0192666 A1 * | 8/2008 | Koskan et al. | 370/311 |
| 2008/0304419 A1 | 12/2008 | Cooper et al. | |
| 2009/0228593 A1 | 9/2009 | Takeda | |
| 2010/0302980 A1 * | 12/2010 | Ji et al. | 370/311 |
| 2010/0329164 A1 * | 12/2010 | Li | 370/311 |
| 2011/0205949 A1 * | 8/2011 | Maenpaa et al. | 370/311 |
| 2013/0089015 A1 * | 4/2013 | Choong | 370/311 |

FOREIGN PATENT DOCUMENTS

WO    WO 2010022774 A1    4/2010

OTHER PUBLICATIONS

International Search Report for PCT Application No. PCT/US11/29175, mailed May 26, 2011.
Extended European Search Report for EP Application No. 10157656.9, dated Aug. 27, 2010.
Stoica et al., "Chord: A Scalable Peer-to-peer Lookup Protocol for Internet Applications", IEEE/ACM Trans. on Networking, vol. 11, No. 1, Feb. 2003, pp. 1-14.
IETF, Peer-to-Peer Session Initiation Protocol (p2psip), pp. 1-4. http://www.ietf.org/html.charters/p2psip-charter.html.
Jennings et al., "Resource Location and Discovery (RELOAD) Base Protocol", draft-ietf-p2psip-base-05 (work in progress), Oct. 2009, pp. 1-104.
Chung et al., "Steady State Analysis of P-MIP Mobility Management", IEEE Communications Lettersvol. 7, No. 6, Jun. 2003, pp. 1-3.
Jennings et al., "A SIP Usage for RELOAD", draft-ietf-p2psip-sip-03 (work in progress), Oct. 2009, pp. 1-9.
European Patent Office Communication; EPO, Application No. 10 157 656.9-2413; Ref. P49476EP/GCF; Date: Jun. 12, 2011; pp. 1-4.

\* cited by examiner

*Primary Examiner* — Ario Etienne
*Assistant Examiner* — Clayton R Williams
(74) *Attorney, Agent, or Firm* — Cantor Colburn LLP

(57) ABSTRACT

The embodiments disclosed herein provide a system, apparatus, and method for managing requests in a peer-to-peer network. A processor determines whether to reduce an amount of checks for connectivity for the device in the peer-to-peer network in response to a device being in the peer-to-peer network. The processor configures the device to send a message indicating a status of the device to a number of other devices in the peer-to-peer network without receiving a request for the status of the device in response to a determination to reduce the amount of checks for connectivity for the device in the peer-to-peer network.

13 Claims, 13 Drawing Sheets

PEER-TO-PEER NETWORK CONNECTIVITY STATUS

TECHNICAL FIELD

The present disclosure relates generally to a peer-to-peer network and, in particular, to a method, apparatus, and system for checking the status of connectivity for devices in a peer-to-peer network.

BACKGROUND

A mobile or cellular telephone system is an example of a communication system that is capable of transmitting and receiving data between end user equipment or applications and network equipment. Transmitted and received data may be in the form of data packets. Transmitted data packets may be in a variety of formats and include a variety of different types of data, including voice data, binary data, video data, and the like.

A communication system, such as a mobile or cellular telephone communication system, may operate in a peer-to-peer network. A peer-to-peer network is composed of participants that make a portion of their resources, such as processing power, disk storage, or network bandwidth, directly available to other network participants without the need for central coordination, such as servers or hosts. Participants are both suppliers and consumers of resources, in contrast to the traditional client-server model where only servers supply, and clients consume.

Peer-to-peer networks may use an overlay network. An overlay network is a computer network which is built on top of an underlying network. Nodes in overlay networks can be thought of as being connected by virtual links, each of which corresponds to a path, perhaps through many physical links, in the underlying network. For example, peer-to-peer networks may be overlay networks because they run on top of the Internet and/or a cellular network.

Nodes may be connection points in an overlay network. Each node may act as either a redistribution point or a communication endpoint. Nodes may be defined according to the type of network and protocol layer. However, in one or more illustrative embodiments, each node of nodes is an active electronic device that is attached to an overlay network and is capable of sending, receiving, or forwarding information over a peer-to-peer network. Each node in a peer-to-peer network participates in connectivity maintenance of the overlay network. A node periodically sends a message to other nodes in its connected nodes to verify that the connected nodes are still available.

It would be advantageous to have a method and apparatus that takes into account at least some of the issues discussed above, as well as possibly other issues.

BRIEF DESCRIPTION OF THE DRAWINGS

For a better understanding of the various embodiments described herein, and to show more clearly how they may be carried into effect, reference will now be made, by way of example only, to the accompanying drawings which show at least one exemplary embodiment and in which.

DETAILED DESCRIPTION

Figure 1:
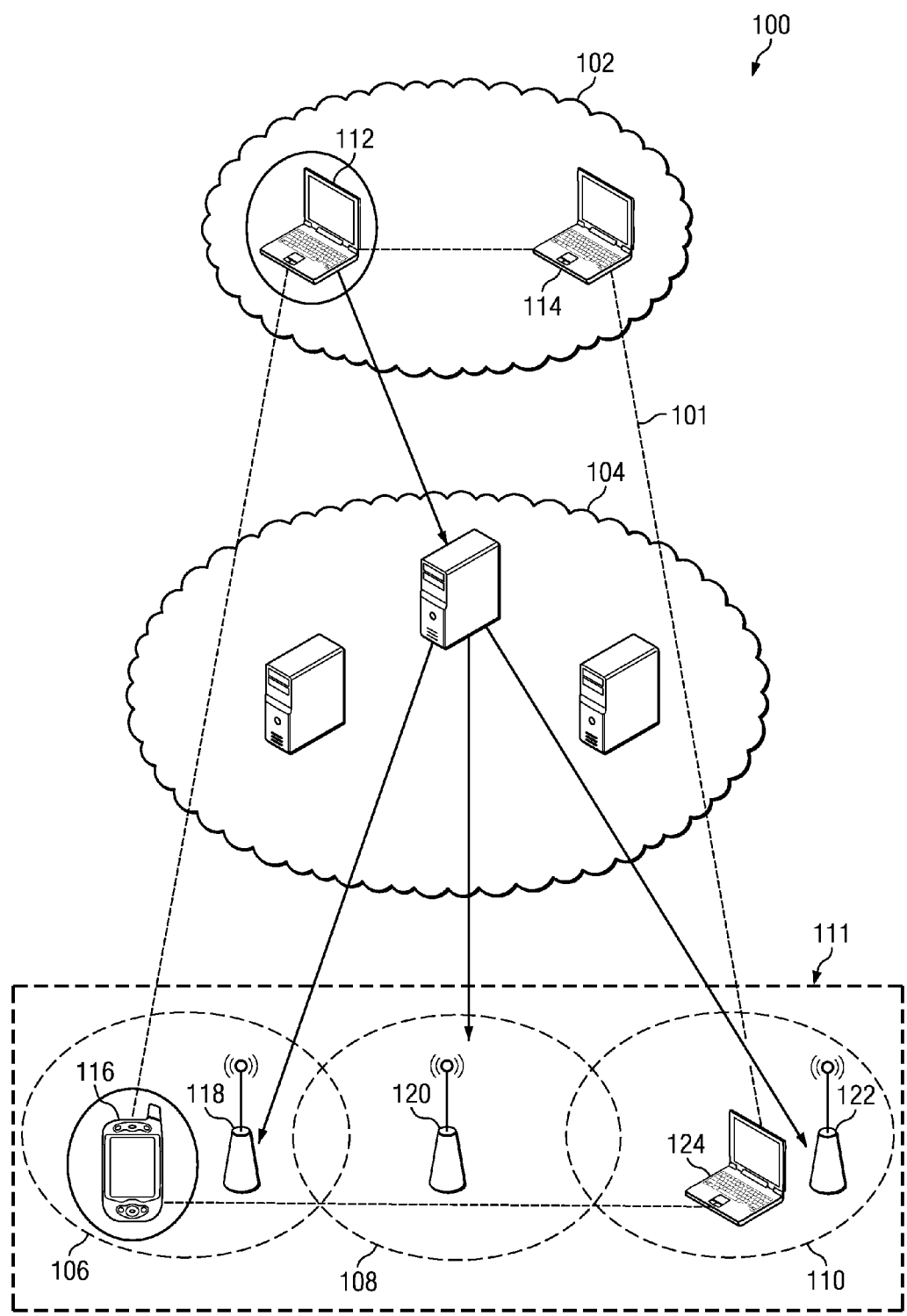
FIG. 1 is a diagram of a network depicted in accordance with an illustrative embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device, with or without telephony capabilities.

The different embodiments disclosed herein recognize and take into account a number of different considerations. For example, the disclosed embodiments recognize and take into account that current peer-to-peer networks send messages checking the connectivity of many devices. For example, a device in current peer-to-peer networks will periodically check the connectivity of other devices that are connected with the device. One or more of the other devices may be a mobile device. The cell location of the mobile device may not be known if the mobile device is in an idle state at the time of connectivity checking. When the cell is unknown, multiple pages are sent to all cells within a paging area. Paging multiple cells creates signal loading on the network. The more mobile peers and the larger paging area size, the more signal loading. Additionally, the mobile device is in an idle state and the idle state is interrupted to respond to the connectivity check. Responding to multiple connectivity checks from devices may decrease battery power levels.

The embodiments disclosed herein provide a system, apparatus, and method for managing requests in a peer-to-peer network. A processor determines whether to reduce an amount of checks for connectivity for the device in the peer-to-peer network in response to a device being in the peer-to-peer network. The processor configures the device to send a message indicating a status of the device to a number of other devices in the peer-to-peer network without receiving a request for the status of the device in response to a determination to reduce the amount of checks for connectivity for the device in the peer-to-peer network.

Turning to FIG. 1, a diagram of a network is depicted in accordance with an illustrative embodiment. Network 100 includes peer-to-peer network 101, internet 102, cellular core network 104, and cellular cells 106-110, which belong to a paging area 111. Peer-to-peer network 101 is an overlay network. An overlay network is a computer network which is built on top of an underlying network. Nodes in an overlay network can be thought of as being connected by virtual links, each of which corresponds to a path, perhaps through many physical links, in the underlying network. For example, peer-to-peer networks may be overlay networks because they run on top of the Internet and/or a cellular network.

Nodes 112 and 114 are connected to peer-to-peer network 101 through internet 102. In contrast, nodes 116 and 124 are connected to peer-to-peer network 101 through mobile cellular access. Node 112 may directly communicate with node 114 and node 116. Even though node 112 may directly communicate with node 114, many physical connections must be made to transfer data between the nodes. For example, communication between node 112 and node 114 travels through internet 102 to cellular core network 104, then from cellular core network 104 to cellular cell 106. Additionally, each connection, such as internet 102 to cellular core network 104 may have further connections within the connections between each other. Additionally, internet 102 may have a further number of connections within itself.

In peer-to-peer network 100, nodes may check the connectivity of neighboring nodes. For example, node 112 may check the connectivity of nodes 114 and 116. Since node 116 is a mobile cellular device, node 116 may go to an idle state. When in an idle state, network 100 only knows the location of node 116 at the accuracy of a paging area. Node 116 is in paging area 111. A paging area may comprise multiple cells of a cellular network. A mobile device may move from one cell to another without doing location updates as long as it does not cross the boundary of a paging area.

For example, when node 112 sends a connectivity request, also referred to as "checks for connectivity", across peer-to-peer network 101 the paging procedure will be triggered in cellular core network 104. Paging messages will be sent to base stations 118-122 belonging to paging area 111, respectively. Base stations 118-122 will broadcast the paging message. By monitoring the paging channel, the mobile device which represents node 116 will capture the paging message. Node 116 will then convert to an active state and send a message back to node 112 indicating its connectivity to peer-to-peer network 101.

Figure 2:
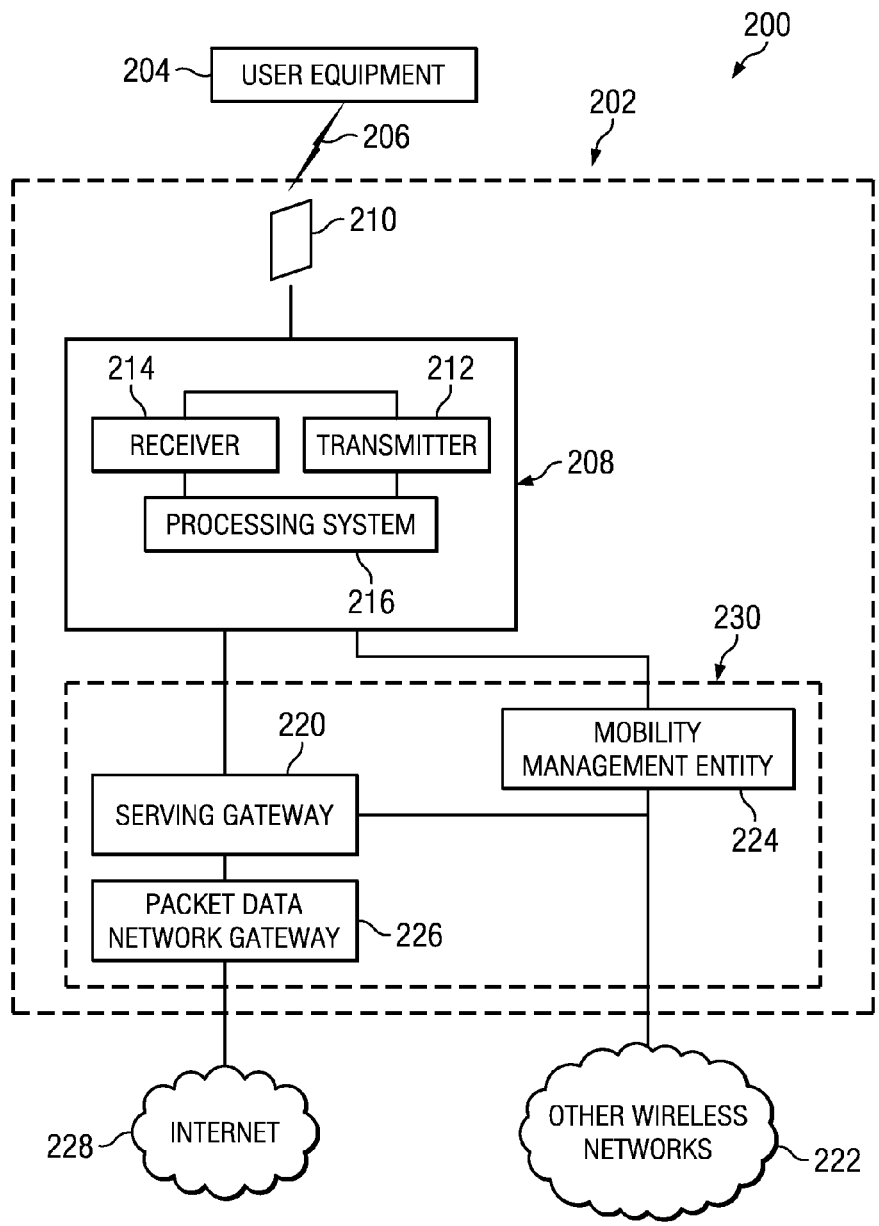
FIG. 2 is a wireless communications system in accordance with an illustrative embodiment.

Turning now to FIG. 2, a wireless communications system in accordance with an illustrative embodiment is depicted. Wireless communications system 200 includes wireless communications network 202. For example, wireless communications network 202 may be a wireless network implemented in accordance with the Long Term Evolution, LTE, standard for mobile network technology. It should be understood, however, that illustrative embodiments may be implemented in other wireless communications networks, such as a Universal Mobile Telecommunications System, UMTS, network, a Global Systems for Mobile, GSM, network, or any other current or future wireless network employing any other standard or technology. Wireless communications network 202 may comprise a single network or multiple networks forming a network of networks.

Wireless communications network 202 provides wireless communications with user equipment 204 via wireless communications channel 206. As will be discussed in more detail below, examples of user equipment 204 may include mobile wireless communication devices including pagers, cellular phones, cellular smart-phones, wireless organizers, personal digital assistants, computers, laptops, handheld wireless communication devices, wirelessly enabled notebook computers and the like. Although only user equipment 204 is shown by example in FIG. 2, wireless communications network 202 may support simultaneous communications with large numbers of user equipment of various different types.

Wireless communications channel 206 is established dynamically between user equipment 204 and node 208 of wireless communications network 202. Channel 206 may be established, for example, at the time that a call to or from user equipment 204 is initiated. For a Long Term Evolution network, the air interface between user equipment 204 and node 208 is the Evolved Universal Mobile Telecommunications System Terrestrial Radio Access Network, E-UTRAN.

Node 208 is a radio access node providing the interface between wireless communications network 202 and user equipment 204. Although only node 208 is shown in FIG. 2, wireless communications network 202 in accordance with an illustrative embodiment, may include many similar nodes. Node 208 may be referred to generically as a base transceiver station. Node 208 includes one or more radio frequency transmitters 212 and receivers 214 coupled to one or more antennas 210. E-UTRAN employs multiple-input and multiple-output, MIMO, technology. Therefore, node 208 in a Long Term Evolution network may employ multiple antennas 210 for communication with user equipment 204 over wireless channel 206, such as up to four antennas 210 per node 208. Antenna 210 may include smart antenna arrays with signal processing algorithms used to identify spatial signal signatures, such as the direction of arrival of a signal, and to use such signatures to calculate beamforming vectors, to track and locate the antenna beam on mobile user equipment 204.

Transmitter 212 and receiver 214 are used by node 208 to communicate directly with mobile devices, such as user equipment 204, via wireless communication channel 206. Node 208 provides wireless network coverage for a particular coverage area, commonly referred to as a "cell". Node 208 includes one or more processing systems 216, such as computer processing systems, for implementing the functionality provided by node 208. In a Long Term Evolution network, node 208 is an Evolved Universal Terrestrial Radio Access Network Node B, E-UTRAN Node B, or eNB. Such a node performs many functions, including radio resource management, admission control, scheduling, enforcement of negotiated uplink quality of service, cell information broadcast, ciphering and deciphering of user and control data, and compression and decompression of downlink and uplink user packet headers. Such functionality may be implemented in software programs executed by processing system 216.

Serving gateway 220 routes and forwards user data packets to and from node 208. Serving gateway 220 also acts as a mobility anchor during inter-node handovers, which occur when user equipment 204 moves out of the coverage area of one node 208 and into the coverage area of another node. Similarly, Serving gateway 220 acts as the anchor for mobility between long term evolution wireless communications network 202 and other wireless networks 222 using other standards and technologies.

Mobility management entity 224 is responsible for tracking and paging procedures, including retransmissions, when user equipment 204 is in idle mode, that is, when user equipment 204 is not actively transmitting and receiving data via node. It is involved in the activation and deactivation process, and is also responsible for choosing the serving gateway at the initial attachment of user equipment 204 to wireless communications network 202 and at the time of a handover involving node reallocation. It is responsible for authenticating users. Mobility management entity 224 also provides the control functions for mobility between wireless communications network 202 and other wireless networks 222 using other standards and technologies.

Packet Data Network Gateway 226 provides connectivity to external packet data networks, such as the Internet 228. Thus, Packet Data Network Gateway 226 provides connectivity for user equipment 204 to external packet data networks by being the point of exit and entry of packet data network traffic for user equipment 204. User equipment 204 may have simultaneous connectivity with more than one Packet Data Network Gateway for accessing more than one packet data network.

Serving Gateway 220, Mobility Management Entity 224, and Packet Data Network Gateway 226 form core network 230 of Long Term Evolution wireless communications network 202. Although only Serving Gateway 220, Mobility Management Entity 224, and Packet Data Network Gateway 226 are shown in the example illustrated in FIG. 2, core network 230 of a Long Term Evolution wireless network in accordance with an illustrative embodiment may include multiple Serving Gateways, Mobility Management Entities, and Packet Data Network Gateways. A Long Term Evolution wireless network provides for network support and load sharing of traffic across network elements in the core network 230 by creating pools of Mobility Management Entities and Serving Gateways and allowing each node 208 in the network to be connected to multiple Mobility Management Entities and Serving Gateways in a pool. The various nodes 208 of wireless communications network 202 may communicate with each other via a backhaul communication channel extending through core network 230.

It can be seen that a main function of core network 230 is to provide for the routing of data packets among user equipment 204 on wireless communications network 202 and between user equipment 204 on wireless communications network 202 and users on other networks, such as other wireless networks 222 and other public or private networks, such as the Internet 228, the Public Switched Telephone Network, and the like. Functions provided by core network 230 in Long Term Evolution wireless communications network 202, as illustrated in FIG. 2, may be provided by different systems and structures in different types of wireless networks in which illustrative embodiments may be implemented, including, for example, in Global System for Mobile Communications, GSM, and Universal Mobile Telecommunications System, UMTS, networks. The list of components presented with respect to FIG. 2 is not meant to be an exhaustive list of the components of a wireless network, but rather a list of components that are commonly used in communications through wireless communications network 202.

Figure 3:
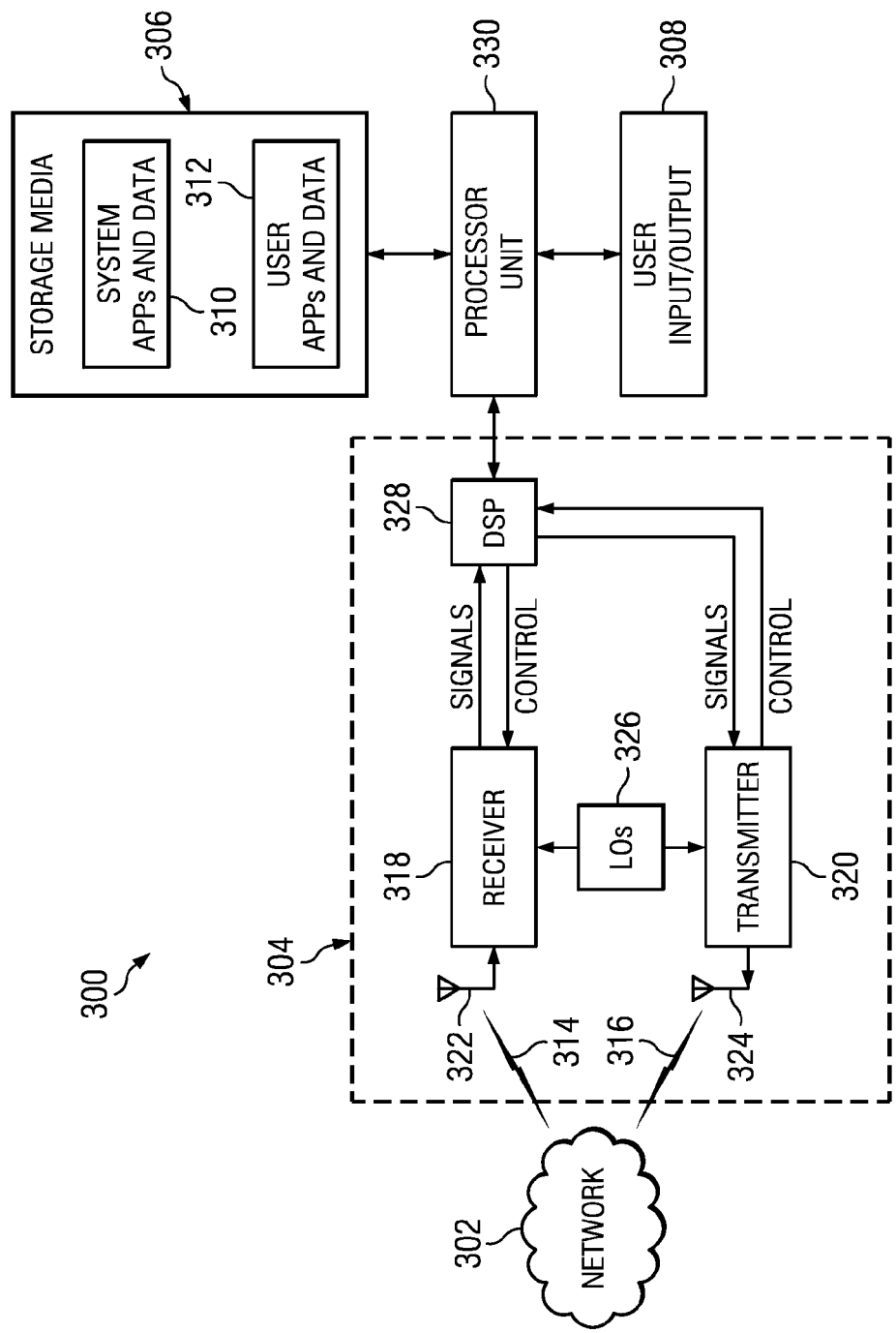
FIG. 3 is a block diagram of wireless user equipment in accordance with an illustrative embodiment.

FIG. 3 is a block diagram of wireless user equipment in accordance with an illustrative embodiment. In this example, user equipment 300 is an example of user equipment 204 in FIG. 2. User equipment 300 may include any two-way communication device with data communication capabilities, including the capability to communicate with other user equipment, computer systems, or other devices through a wireless communications network, such as, for example, wireless communications network 202 described above with reference to FIG. 2. User equipment 300 may, but need not, have the capability to provide voice communications. Depending on the functionality provided, user equipment 300 may be referred to as a data messaging device, a two-way pager, a cellular telephone with data messaging capabilities, a wireless Internet appliance, or a data communications device, with or without telephony capabilities.

User equipment 300 includes processor unit 330. Processor unit 330 may be implemented, for example, but not limited to, as a single core processor, multicore processor, multiple processors, and/or one processor. Processor unit 330 controls the overall operation of user equipment 300. Processor unit 330 may be implemented as one or more individual programmable processing devices, including one or more microprocessors or similar devices adapted for running computer programs.

Processor unit 330 interacts with user equipment subsystems, such as communications subsystem 304, storage media 306, and user input and output subsystems 308. Communications subsystem 304 will be described in more detail below. Storage media 306 may include various types of memory media or memory devices readable by processor unit 330, such as random access memory, read-only memory, flash memory, a Subscriber Identity Module, SIM, or a Removable User Identity Module, RUIM, card, or any other type of media, device, or structure for storing computer programs and data in any form usable by processor unit 330. User input and output subsystem 308 includes devices or structures for providing direct user interaction with user equipment 300. For example, user input and output subsystem 308 may include a display, keyboard or key pad, speaker, microphone, or any other device or structure providing for direct interaction of a user with user equipment 300, such as a touch screen, mouse, track ball, infrared fingerprint detector, or a roller wheel with dynamic button pressing capability. User equipment 300 may include subsystems other than those illustrated in FIG. 3 and described in detail herein, such as a data port, a short-range wireless communications device, a battery interface to one or more rechargeable batteries, and other device subsystems. All user equipment subsystems may be in direct or indirect communication with processor unit 330, such that processor unit 330 may interact with or control operation of the subsystems, as appropriate.

Storage media 306 includes stored therein computer programs in the form of software components that are run by processor unit 330 and associated data used in running the programs or resulting from execution of the programs. Computer programs and related data stored in storage media 306 include computer programs implementing system applications and related system applications and data 310 and computer programs implementing user applications and related user application data 312.

System applications and data 310 include applications implementing functions related to general operation of user equipment 300. System applications and data 310 may operate automatically in a manner that is invisible to a user of user equipment 300. For example, system applications and data 310 may include an operating system application, a connect function for implementing the communication protocols that are required for user equipment 300 to communicate with the wireless infrastructure and any host system that user equipment 300 is authorized to interface with, a device state application providing persistence for ensuring that important device data is stored in persistent memory so that the data is not lost when user equipment 300 is turned off or loses power, a battery power management and charging function, or any other functions necessary or desirable for operation of user equipment 300.

User applications and data 312 include applications implementing functions that are used by a user of user equipment 304 via user interaction with user input and output subsystem 308. User applications and data 312 may include messaging functions that allow a user to create, send, receive, view, and save various types of messages. Other user applications and data 312 may include a personal information manager application including functionality for organizing and managing data items of interest to the user, such as, but not limited to, e-mail, contacts, calendar events, voice mails, appointments, and task items. A personal information manager application may have the ability to send and receive data items via wireless network 302. Personal information data items may be seamlessly integrated, synchronized, and updated via wireless network 302 with the user equipment subscriber's corresponding data items stored or associated with a host computer system. This functionality creates a mirrored host computer on user equipment 300 with respect to such items. This can be particularly advantageous when the host computer system is the user equipment subscriber's office computer system.

Other types of programs or software applications also may be installed in storage media 306 on user equipment 300. Such software applications may include third party applications, which are added after the manufacture of user equipment 300. Examples of third party applications include user applications and data 312 such as games, calculators, utilities, etc. Additional system applications and data 310 or user applications and data 312 may be loaded onto user equipment 300 via wireless network 302, an auxiliary I/O subsystem, a data port, a short-range wireless communications subsystem, or any other suitable device subsystem provided on user equipment 300.

Communication functions, including data and voice communications, are performed by communications subsystem 304. Communications subsystem 304 receives messages from, and sends messages to, wireless network 302. For example, communication subsystem 304 may be configured to send and receive messages in the form of data packets in accordance with the Long Term Evolution, LTE, technology standard using Evolved Universal Mobile Telecommunications System Terrestrial Radio Access Network, E-UTRAN, technology. Alternatively, or additionally, communication subsystem 304 may be configured to use Universal Mobile Telecommunications System Terrestrial Radio Access Network, UTRAN, technology, or in accordance with the Global System for Mobile Communication, GSM, and General Packet Radio Services, GPRS, standards. Other wireless networks also may be associated with user equipment 300 in variant implementations. The different types of wireless networks that may be employed include, for example, data-centric wireless networks, voice-centric wireless networks, and dual-mode networks that can support both voice and data communications over the same physical base stations, such as those described by example above. New standards are still being defined, but it is believed that wireless networks implemented in accordance with new standards will have similarities to the networks described herein. It will also be understood by persons skilled in the art that the embodiments described herein are intended to use any other suitable standards that are developed in the future.

Wireless links 314 and 316 connecting communication subsystem 304 with wireless network 302 represent one or more different radio frequency, RF, channels, operating according to defined protocols specified for the particular communication technologies being employed. With certain network protocols, channels 314 and 316 are capable of supporting both circuit switched voice communications and packet switched data communications.

Communications subsystem 304 includes receiver 318 and transmitter 320, as well as associated components, such as one or more embedded or internal antenna elements 322 and 324, local oscillators, LOs, 326, and a processing module, such as a digital signal processor, DSP, 328. The particular design of communications subsystem 304 is dependent upon the communication network 302 with which user equipment 300 is intended to operate. Thus, communications subsystem 304 illustrated in FIG. 3 provides only an example of a communications subsystem for user equipment in accordance with an illustrative embodiment.

Downlink signals received by antenna 322 from wireless network 302 on wireless downlink channel 314 are input to receiver 318. Receiver 318 may be adapted to perform such common receiver functions as signal amplification, frequency down conversion, filtering, channel selection, and analog-to-digital conversion. Analog-to-digital conversion of a received signal allows more complex communication functions, such as demodulation and decoding, to be performed in digital signal processor 328. In a similar manner, uplink signals to be transmitted are processed, including modulation and encoding, by digital signal processor 328. The processed uplink signals from digital signal processor 328 are input to transmitter 320. Transmitter 320 may be adapted to perform such common transmitter functions as digital-to-analog conversion, frequency up conversion, filtering, amplification and transmission to wireless network 302 over wireless uplink channel 316 via antenna 324. Digital signal processor 328 may not only processes communication signals, but also provides for receiver and transmitter control. For example, gains applied to communication signals in receiver 318 and transmitter 320 may be adaptively controlled through automatic gain control algorithms implemented in digital signal processor 328.

The wireless link between user equipment 300 and wireless network 302 may contain one or more different channels, typically different radio frequency channels, and associated protocols used between user equipment 300 and wireless network 302. A radio frequency channel is a limited resource that must be conserved, typically due to limits in overall bandwidth and limited battery power of user equipment 300. When user equipment 300 is fully operational, transmitter 320 typically is keyed or turned on only when it is transmitting to wireless network 302 and is otherwise turned off to conserve resources. Similarly, receiver 318 is periodically turned off during designated time periods to conserve power until it is needed to receive signals or information.

In use, a received signal such as a text message, an e-mail message, or web page download, is processed by communication subsystem 304 and provided to processor unit 330. Processor unit 330 will then process the received signal for output to a user output device 308, such as a display. A user may also compose data items, such as e-mail messages, for example, using user input and output device 308, such as a keyboard in conjunction with a display. A composed item may be transmitted to wireless network 302 through communications subsystem 304.

For voice communications, the overall operation of user equipment 300 is substantially similar, except that the received signals are output to a speaker and signals for transmission are generated by a microphone. Alternative voice or audio input and output subsystems, such as a voice message recording subsystem, can also be implemented on user equipment 300. Although voice or audio signal output is accomplished primarily through a speaker, a display can also be used to provide additional information, such as the identity of a calling party, duration of a voice call, or other voice call related information.

One or more different illustrative embodiments may be applied to types of communications and standards other than those described above with respect to FIGS. 2 and 3. For example, without limitation, the different illustrative embodiments may be implemented using LTE Advanced. Additionally, the wireless networks illustrated may take the form of or include 4G networks.

Figure 4:
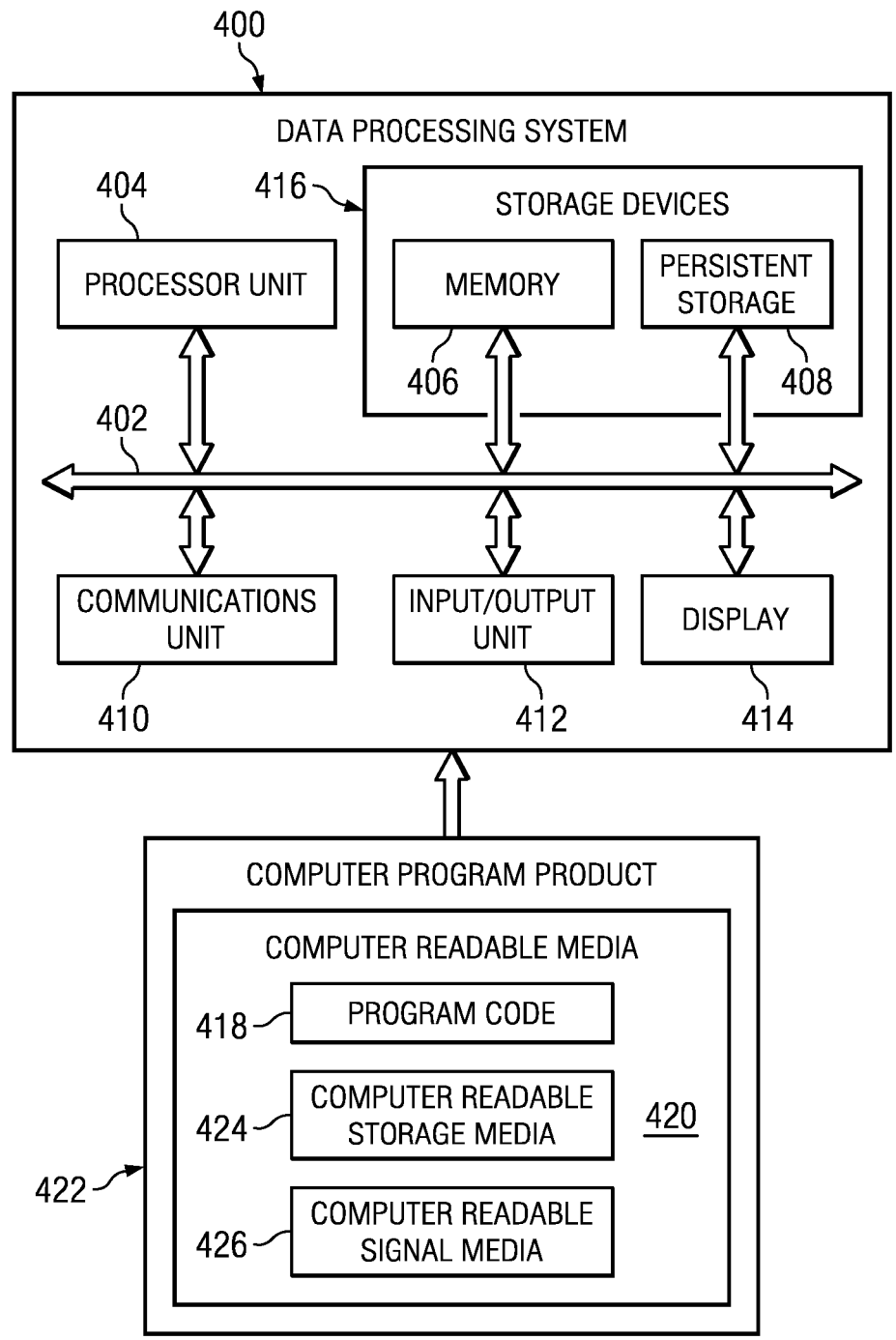
FIG. 4 is a block diagram of a data processing system in accordance with an illustrative embodiment.

FIG. 4 is block diagram of a data processing system depicted in accordance with an illustrative embodiment. In this example, data processing system 400 is an example of one implementation of processing system 216 in node 208 in FIG. 2. Data processing system 400, or portions thereof, also may be used to implement one or more functions of user equipment 300 as illustrated in FIG. 3. In this illustrative example, data processing system 400 includes communications fabric 402, which provides communications between processor unit 404, memory 406, persistent storage 408, communications unit 410, input/output unit 412, and display 414.

Processor unit 404 serves to execute instructions for software that may be loaded into memory 406. Processor unit 404 may be a set of one or more processors or may be a multiprocessor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory, or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 in order to be run by processor unit 404. The processes of the different embodiments may be performed by processor unit 404 using computer implemented instructions, which may be located in a memory, such as memory 406.

These instructions are referred to as program code, computer usable program code, or computer readable program code that may be read and run by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 to be run by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disc that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to, or in place of, those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The illustrations of hardware components in FIGS. 2-4 are not meant to imply physical or architectural limitations to the manner in which different illustrative embodiments may be implemented. Other components in addition to, or in place of, the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 5:
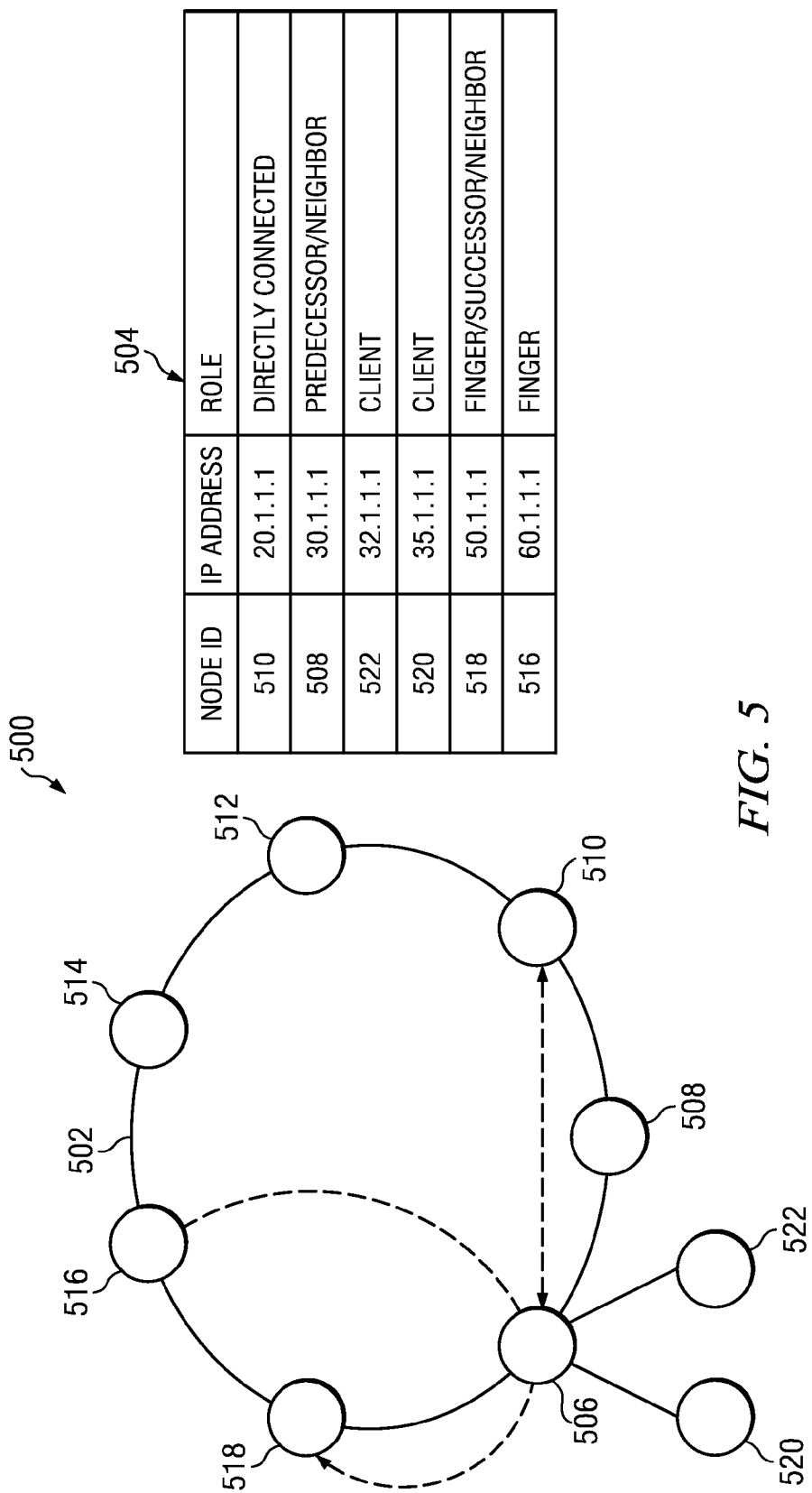
FIG. 5 is a block diagram of a peer-to-peer network depicted in accordance with an illustrative embodiment.

Turning to FIG. 5, a block diagram of a peer-to-peer network is depicted in accordance with an illustrative embodiment. In this example, peer-to-peer network 500 is an example of one implementation of peer-to-peer network 101 as shown in FIG. 1. Peer-to-peer network 500, or portions thereof, also may be used to implement one or more functions of user equipment 300 as shown in FIG. 3. In this illustrative example, peer-to-peer network 500 includes overlay network 502 and connection table 504.

Overlay network 502 is a computer network which is built on top of an underlying network. Overlay network 502 may be one example of one implementation of overlay network 101 as shown in FIG. 1. Nodes 506-522 in overlay network 502 can be thought of as being connected by virtual links, each of which corresponds to a path, perhaps through many physical links, in the underlying network. For example, peer-to-peer networks may be overlay networks because they run on top of the Internet and/or a cellular network.

Nodes 506-522 may be connection points in overlay network 502. Each node may act as either a redistribution point or a communication endpoint. Nodes 506-522 may be defined according to the type of network and protocol layer. However, in one or more illustrative embodiments, each node of nodes 506-522 is an active electronic device that is attached to overlay network 502, and is capable of sending, receiving, or forwarding information over peer-to-peer network 500.

Some nodes 506-522 may directly communicate with one another and some nodes 506-522 may not directly communicate. For example, node 506 may directly communicate with node 508 in overlay network 502. In the underlying network, there may exist multiple connections and physical links between node 506 and node 508. In contrast, node 512 may not directly communicate with node 508. Data traveling from node 512 to node 508 travels though other nodes to get to node 508, such as node 510.

Nodes 506-522 may directly communicate with other nodes of which the internet protocol addresses are known. Each node knows the internet protocol addresses that are located in a connection table, such as connection table 504 for node 506. Node 506 knows the internet protocol address of nodes 508, 510, 516, 518, 520, and 522. Therefore, node 506 may directly communicate with nodes 508, 510, 516, 518, 520, and 522. However, for node 506 to communicate with nodes 512 and 514, node 506 must communicate through at least one of nodes 508, 510, 516, 518, 520, and 522.

Connection table 504 also includes the type of connection node 506 has with each node that it may directly communicate. For example, nodes 508 and 518 are neighboring nodes. Neighboring nodes are nodes which precede and succeed node 506 in the overlay network. Nodes 520 and 522 are client nodes to node 506. Some nodes may be clients while other nodes may be peers. In overlay network 502, nodes 506-518 are peers while nodes 520-522 are clients. A peer is a node that is participating in an overlay network. The peer has a portion of data stored in the overlay network. The peer also routes messages on behalf of other peers and/or clients as required by the overlay network. A client is a node that is not participating in routing or data storage for the overlay network. The client is able to store data and retrieve data from the overlay network.

Figure 6:
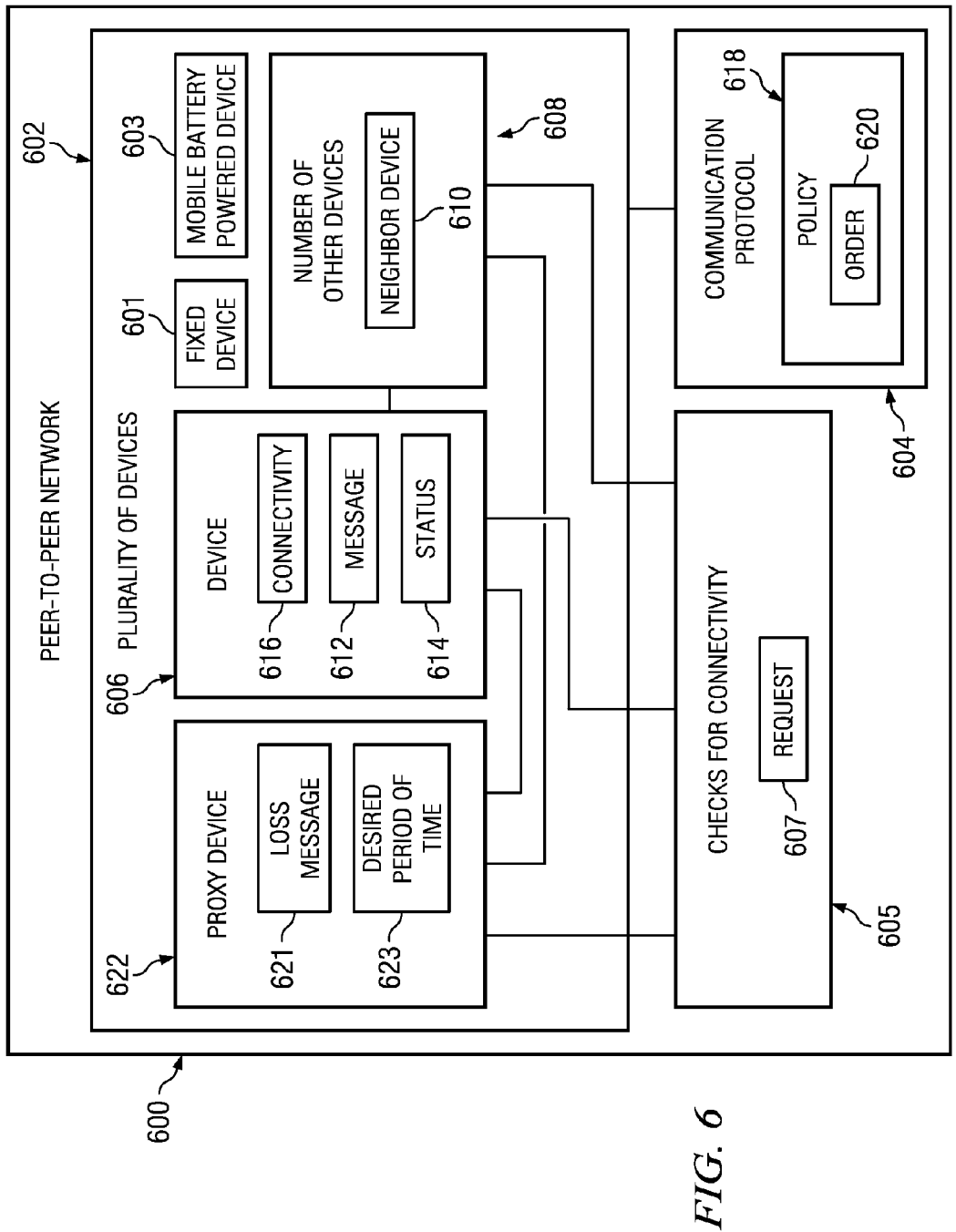
FIG. 6 is a block diagram of a peer-to-peer network depicted in accordance with an illustrative embodiment.

Turning to FIG. 6, a block diagram of a peer-to-peer network is depicted in accordance with an illustrative embodiment. In this example, peer-to-peer network 600 is an example of one implementation of peer-to-peer network 500 as shown in FIG. 5. Peer-to-peer network 600, or portions thereof, also may be used to implement one or more functions of user equipment 300 as shown in FIG. 3. In this illustrative example, peer-to-peer network 600 includes plurality of devices 602, communication protocol 604, and checks for connectivity 605.

Plurality of devices 602 is used in a peer-to-peer network to receive and transmit data. Each device in plurality of devices 602 may comprise, for example, but not limited to, a server, a mobile phone, a laptop connected through a Wi-Fi connection, a laptop connected through a cellular network, a computer system connected by a wired connection, and/or a computer connected by a wireless connection. Fixed device 601 may be a device that is not able to be moved and powered while in transit such as, for example, a computer system connected by a wired connection. Mobile and battery powered device 603 may be a device that is moveable and still connected to the network without wires such as, for example, a mobile phone. Plurality of devices 602 may comprise device 606, number of other devices 608, and proxy device 622. Device 606 may be mobile and battery powered device 603. Number of other devices 608 may be fixed device 601 or mobile and battery powered device 603.

In one illustrative example, device 606 may be determined to conserve energy compared to number of other devices 608. Reducing an amount of checks for connectivity 605 for device 606 in peer-to-peer network 600 may reduce energy consumed be device 606. Checks for connectivity 605 result from each device of plurality of devices 602 requesting a status of the connectivity of each device that a device of plurality of devices 602 has in a connection table. The connection table may be, for example, connection table 504 as shown in FIG. 5. Checks for connectivity 605 may include request 607. Request 607 may be, for example, a request for status 614 of connectivity 616 of device 606.

The determination to conserve energy, and accordingly, checks for connectivity 605, may result from identification that device 606 is a mobile device. A mobile device may be any device in which power conservation is desirable. In some illustrative embodiments, a mobile device is one that is not currently connected to a wired power source, such as, but not limited to, an electrical socket in a building. In other illustrative embodiments, the determination to reduce checks for connectivity 605 may result from other reasons, such as, for example, reducing the load on peer-to-peer network 600.

When device 606 is identified as a mobile device and/or one that deserves a reduction in checks for connectivity 605, number of other devices 608 are notified that device 606 initiates checks for connectivity with device 606. An illustrative embodiment, for example, may have two devices connected as peers. One of the devices may be device 606 and the other device may be neighbor device 610 of number of other devices 608. If it is desirable to reduce the amount of checks for connectivity 605 with device 606, then device 606 sends message 612 indicating status 614 of device 606 to neighbor device 610 of number of other devices 608 in peer-to-peer network 600 without receiving a request for status 614 of device 606 from neighbor device 610 of number of other devices 608. By sending the message without receiving a request, device 606 is initiating the checks for connectivity. Message 612 may also indicate other information in addition to status 614.

Status 614 may indicate connectivity 616 of device 606. Connectivity 616 is whether device 606 is a member of peer-to-peer network 600. Connectivity 616 is when device 606 is capable of sending and receiving messages to and from number of other devices 608. Connectivity 616 may have any data transfer rate as long as the message is delivered within a time limit. In other illustrative embodiments, connectivity 616 may have to meet a data transfer rate. Also, in other illustrative embodiments, there may not be a time limit. Status 614 may be indicated by setting a flag in message 612 or by using a 1-bit setting. Device 606 may have lost connectivity 616 for a number of reasons, for example, but not limited to, a user ending a peer-to-peer program therefore removing device 606 from peer-to-peer network 600 voluntarily or by losing connection to the underlying network, such as the cellular network.

In some illustrative embodiments, both device 606 and neighbor device 610 are desired to have an amount of checks for connectivity 605 reduced. For example, both device 606 and neighbor device 610 may be mobile devices. When both devices are desired to have the amount of checks for connectivity 605 reduced, both devices indicate to each other that each device will initiate checks for connectivity. When both devices are initiating checks for connectivity 605, policy 618 may define order 620 for the initiating. For example, the devices may take turns initiating or one of the devices is randomly chosen to initiate. Policy 618 may be part of communication protocol 604. Communication protocol 604 is a set of rules for data representation, signaling, authentication and error detection required to send information over a communications channel.

In another illustrative embodiment when both devices are initiating checks for connectivity, proxy device 622 may be used to receive checks for connectivity 605 and distribute checks for connectivity 605 to other devices. Proxy device 622 may be a device that is less desirable to have a reduction in the amount of checks for connectivity 605 than device 606 and/or neighbor device 610. Proxy device 622 may be, for example, but not limited to, a computer and/or server.

Proxy device 622 may send loss message 621 indicating a loss of connectivity 616 of device 606 to number of other devices 608. A loss of connectivity may occur when message 612 from device 606 is not received within a desired period of time 623. Desired period of time 623 may be set by a user. Desired period of time 623 may be any amount of time.

In yet another illustrative embodiment, device 606 is connected to number of other devices 608. Device 606 is desired to have the amount of checks for connectivity 605 reduced. Device 606 is configured to send message 612 indicating status 614 to proxy device 622. Number of devices 608 are configured to request checks for connectivity 605 from proxy device 622.

The illustration of components in FIG. 6 is not meant to imply physical or architectural limitations to the manner in which different illustrative embodiments may be implemented. Other components in addition to, or in place of, the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example there may be other peer-to-peer networks joined with peer-to-peer network 600 of FIG. 6 to create a combination of peer-to-peer networks. Also, for example, while FIG. 6 lists proxy device 622, other proxy devices may exist. Number of other devices 608 may include client devices, directly connected devices, predecessors, successors, and finger connections as well as neighbor device 610.

Figure 7:
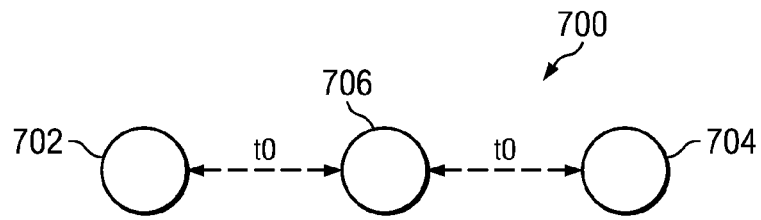
FIG. 7 is a diagram of a peer-to-peer connection depicted in accordance with an illustrative embodiment.

Turning to FIG. 7, a diagram of a peer-to-peer connection is depicted in accordance with an illustrative embodiment. In this example, peer-to-peer connection 700 is an example of one implementation of a connection in peer-to-peer network 600 as shown in FIG. 6. In this illustrative example, peer-to-peer connection 700 includes devices 702 and 704 and proxy device 706.

In this illustrative embodiment, devices 702 and 704 may be devices which are desirable to have the amount of checks for connectivity reduced, such as mobile devices. Proxy device 706 is less concerned with reducing checks for connectivity than devices 702 and 704. Each device 702 and 704 sends a message indicating a status of each device to proxy device 706 during an interval of time (t0). The interval of time (t0) may or may not be the same for each device. Proxy device 706 notifies device 702 or 704 if the other device is not connected.

In one or more illustrative embodiments, both devices 702 and 704 pick proxy device 706. However, in other illustrative embodiments, when proxy device 706 cannot be identified, devices 702 and 704 will message each other directly using another method, such as turn by turn or one device will initiate the checks for connectivity.

Figure 8:
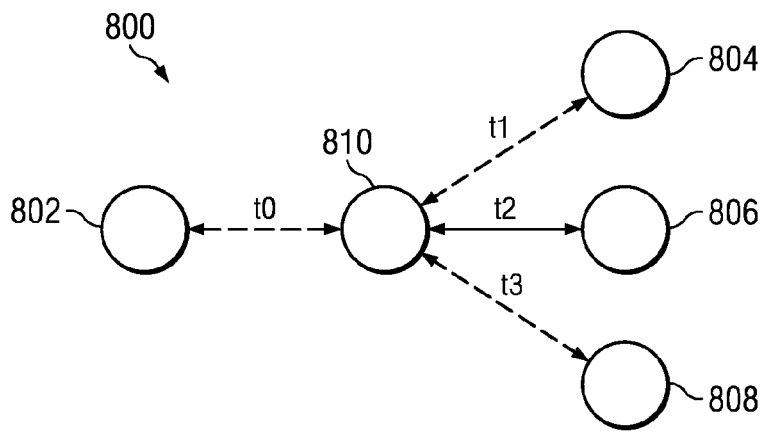
FIG. 8 is a diagram of a peer-to-peer connection depicted in accordance with an illustrative embodiment.

Turning to FIG. 8, a diagram of a peer-to-peer connection is depicted in accordance with an illustrative embodiment. In this example, peer-to-peer connection 800 is an example of one implementation of a connection in peer-to-peer network 600 as shown in FIG. 6. In this illustrative example, peer-to-peer connection 800 includes devices 802-808 and proxy device 810.

In one illustrative embodiment, device 802 may be a device which is desirable to have the amount of checks for connectivity reduced, such as a mobile device. Proxy device 810 and devices 804-808 are less concerned with reducing checks for connectivity than device 802. Device 802 sends a message indicating a status to proxy device 810 during an interval of time (t0). Proxy device 810 then communicates checks for connectivity with devices 804-808. Devices 804-808 may initiate checks for connectivity with proxy device 810.

In another illustrative embodiment, devices 802-808 are all desirable to have the amount of checks for connectivity reduced. In this illustrative embodiment, proxy device 810 may rotate between devices 802-808 and take care of checks for connectivity for each device separately or in turn. In yet another illustrative embodiment, each device of devices 802-808 may have its own proxy device.

Figure 9:
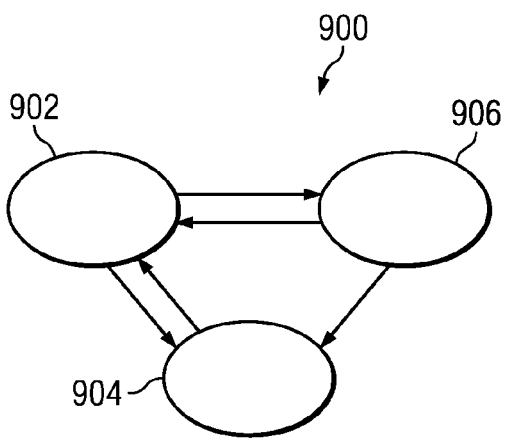
FIG. 9 is a diagram of states of a mobile device depicted in accordance with an illustrative embodiment.

Turning to FIG. 9, a diagram of states of a mobile device is depicted in accordance with an illustrative embodiment. In this example, state diagram 900 may be used to implement one or more functions of user equipment 300 as shown in FIG. 3. In this illustrative example, state diagram 900 includes connected inactive-state 902, connected-active state 904, and idle state 906.

In connected-inactive state 902, there is no outgoing and incoming data, but signaling activities exist such as handover signaling when changing a cell area. The mobile device enters connected-active state 904 if any incoming or outgoing data is transmitted or received during a data session. When the data session is over, the mobile device returns to connected-inactive state 902. The mobile device stays in connected inactive-state 902 until an activity timer expires, which moves the mobile device into idle state 906. If any incoming or outgoing data is transmitted or received, the mobile device transitions from idle state 906 to connected-active state 904.

The mobile device may transition from connected-active state 902 to either idle state 906 or connected-active state 904. The mobile device may transition from idle state 906 to either connected-inactive state 902 or connected-active state 904. The mobile device may transition from connected-active state 904 to connected-inactive state 902. Connected-inactive state 902 consumes less power than connected-active state 904. Idle state 906 consumes less power than connected-inactive state 902.

To respond to a check for connectivity, mobile device must transition to connected-active state 904. In one or more illustrative embodiments, instead of responding to checks for connectivity, mobile device will send a message with a status of its connectivity when it is already in connected-active state 904. During this operation, the mobile device will have notified the other devices to not send a check for connectivity.

Figure 10:
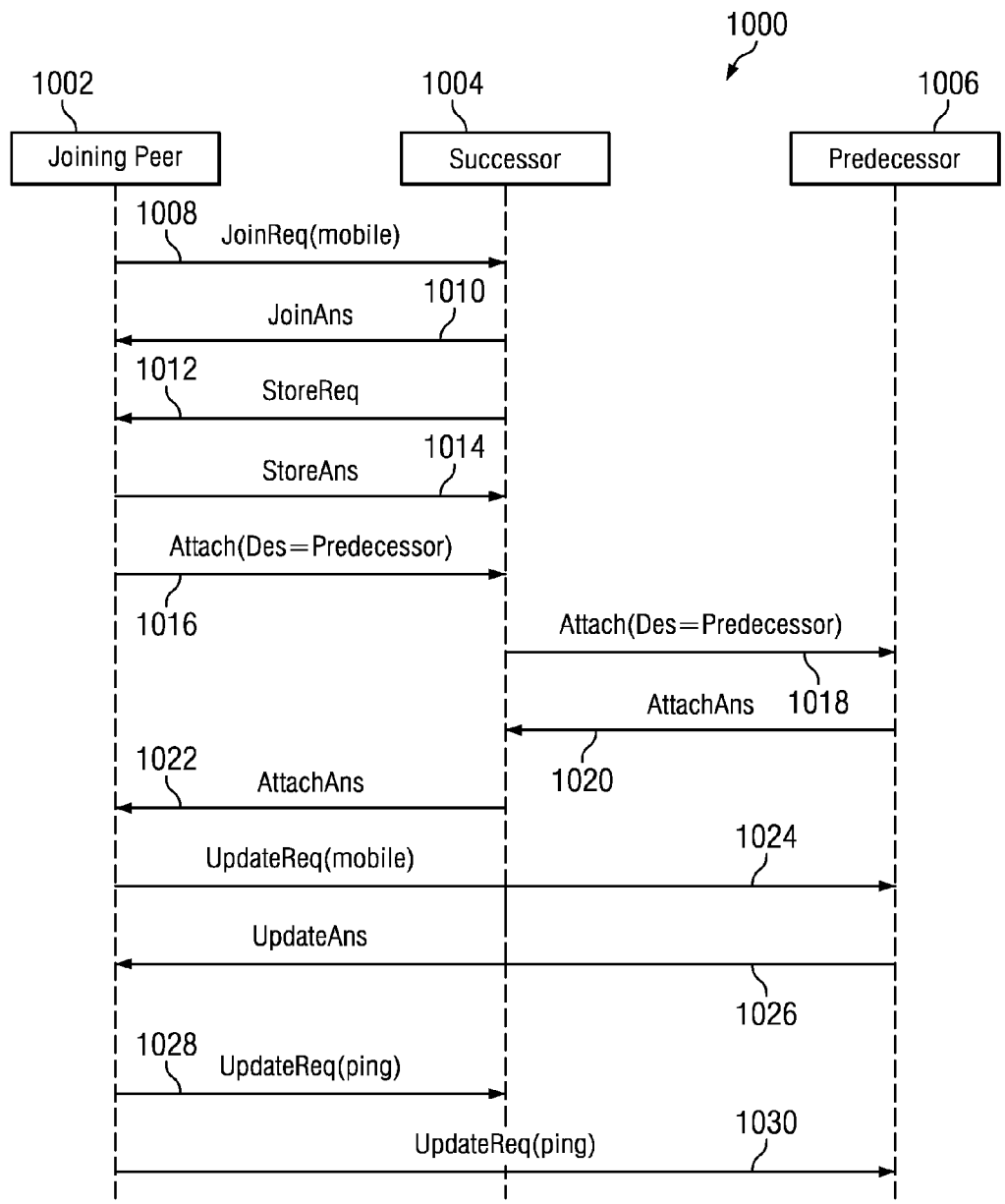
FIG. 10 is a message flow for a mobile device depicted in accordance with an illustrative embodiment.

Turning to FIG. 10, a message flow for a mobile device is depicted in accordance with an illustrative embodiment. In this example, message flow 1000 may be used to implement one or more functions of peer-to-peer network 600 as shown in FIG. 6. In this illustrative example, message flow 1000 includes joining peer 1002, successor 1004, and predecessor 1006. Joining peer 1002 knows the node identification of successor 1002 through, for example, a bootstrap server for the peer-to-peer network, and can communicate with successor 1004 directly based on its IP address. Joining peer 1002 may or may not know the node identification of predecessor 1006 and may or may not communicate with predecessor 1006 directly.

Joining peer 1002 sends a JoinReq command, to successor 1004 (message 1008), to request joining the peer-to-peer network. JoinReq will indicate that joining peer 1002 is a mobile device. Successor 1004 will respond with a JoinAns command (message 1010) to acknowledge the joining request from joining peer 1002. JoinAns may also contain the node identification information of predecessor 1006, which will become the predecessor of the joining peer 1002 after it joins the peer-to-peer network. JoinAns also indicates that joining peer 1002 will initiate checks for connectivity. Successor 1004 sends to joining peer 1002 a StoreReq command (message 1012), which requests joining peer 1002 to store resources for the peer-to-peer network. Based on the node identification of joining peer 1002, joining peer 1002 may be responsible to store the resources that are currently stored in successor 1004. Joining peer 1002 sends to successor 1004 a StoreAns command (message 1014) to acknowledge the resource storage request from successor 1004. Joining peer 1002 sends to successor 1004 an Attach command (message 1016), which indicates the destination of the Attach command as the predecessor 1006 in order to establish the connection with the predecessor. Successor 1004 forwards to predecessor 1006 an Attach command (message 1018). Predecessor 1006 sends to successor 1004 an AttachAns command (message 1020) to acknowledge the Attach command (message 1018). Successor 1004 forwards to joining peer 1002 an AttachAns command (message 1022).

Also, joining peer 1002 will indicate to predecessor 1006 with an UpdateReq command that joining peer 1002 is a mobile device (message 1024). Predecessor 1006 acknowledges that joining peer 1002 will initiate checks for connectivity with UpdateAns (message 1026). Thereafter, joining peer 1002 initiates checks for connectivity by sending messages for a status of connectivity of successor 1004 through an UpdateReq command (message 1028). Joining peer 1002 initiates checks for connectivity by sending messages for a status of connectivity of predecessor 1006 through an UpdateReq command (message 1030).

Figure 11:
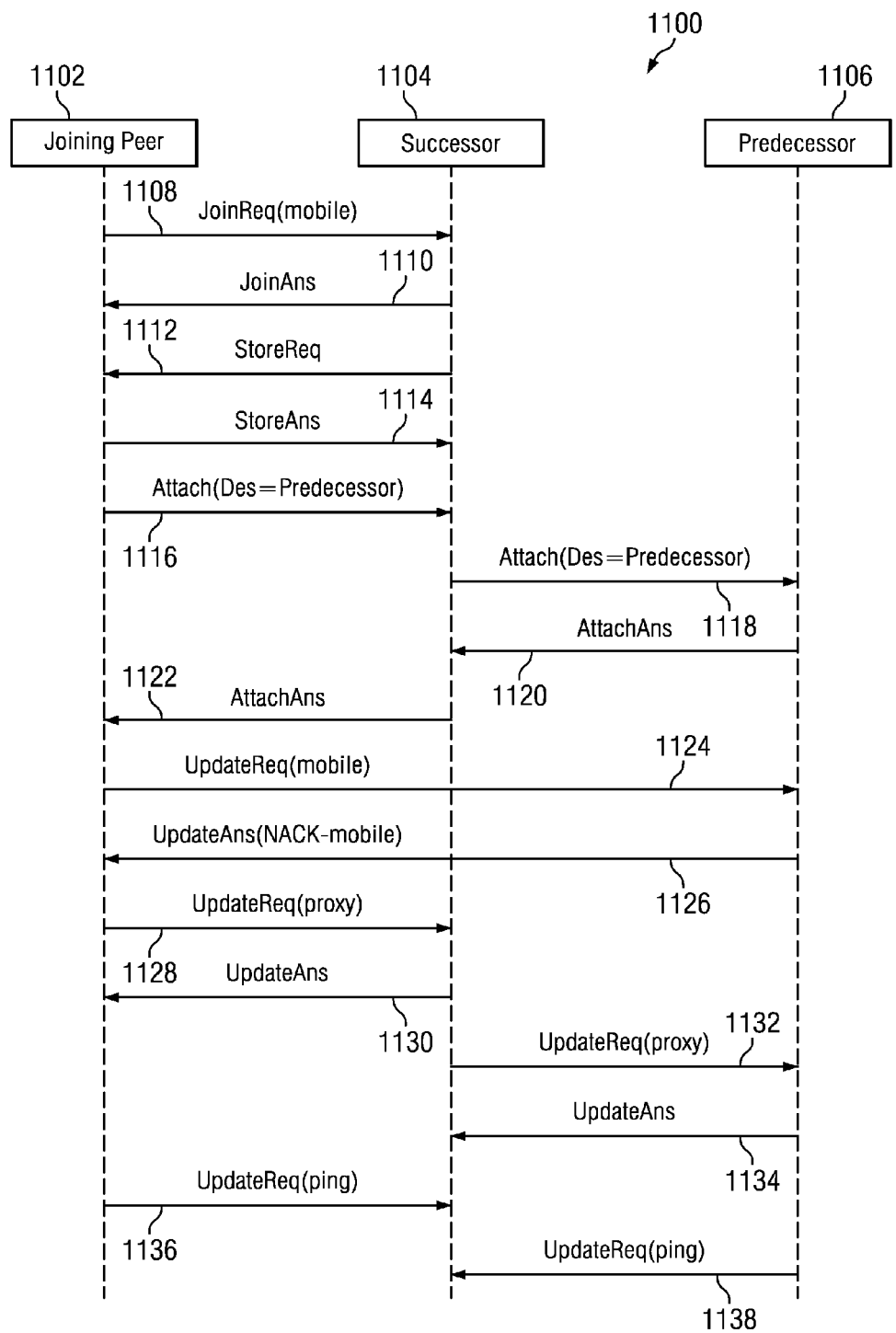
FIG. 11 is a message flow for a mobile device depicted in accordance with an illustrative embodiment.

Turning to FIG. 11, a message flow for a mobile device is depicted in accordance with an illustrative embodiment. In this example, message flow 1100 may be used to implement one or more functions of peer-to-peer network 600 as shown in FIG. 6. In this illustrative example, message flow 1100 includes joining peer 1102, successor 1104, and predecessor 1106. FIG. 11 operates similar to FIG. 10 except FIG. 11 includes a situation where joining peer 1102 and predecessor 1106 are both mobile devices instead of only joining peer 1102 as in FIG. 10.

Joining peer 1102 sends a JoinReq command, to successor 1104 (message 1108), to request joining the peer-to-peer network. JoinReq will indicate that joining peer 1102 is a mobile device. Successor 1104 will respond with a JoinAns command (message 1110) to acknowledge the joining request from joining peer 1002. JoinAns may also contain the node identification information of the predecessor 1006, which will become the predecessor of joining peer 1002 after it joins the peer-to-peer network. JoinAns also indicates that joining peer 1102 will initiate checks for connectivity. Successor 1104 sends to joining peer 1102 a StoreReq command (message 1112), which requests joining peer 1002 to store certain resources for the peer-to-peer network. Based on the node identification of joining peer 1002, joining peer 1002 may be responsible to store the resources that are currently stored in successor 1004. Joining peer 1102 sends to successor 1104 a StoreAns command (message 1114) to acknowledge the resource storage request from successor 1004. Joining peer 1102 sends to successor 1104 an Attach command (message 1116), which indicates the destination of the Attach command as the predecessor 1006 in order to establish the connection with the predecessor. Successor 1104 forwards to predecessor 1106 an Attach command (message 1118). Predecessor 1106 sends to successor 1104 an AttachAns command (message 1120) to acknowledge the Attach command (message 1118). Successor 1104 forwards to joining peer 1102 an AttachAns command (message 1122).

Also, joining peer 1102 will indicate to predecessor 1106 with an UpdateReq command that joining peer 1102 is a mobile device (message 1124). Predecessor 1106 acknowledges that joining peer 1102 will initiate checks for connectivity with UpdateAns and informs joining peer 1102 that predecessor 1106 will also be initiating checks for connectivity (message 1126). Joining peer 1102 picks a proxy server by sending a message to successor 1104 in an UpdtateReq command (message 1128). Successor 1104 acknowledges itself as the proxy server in an UpdateAns command (message 1130). Successor 1104 informs predecessor 1106 that it is the proxy server in an UpdateReq command to predecessor 1106 (message 1132). Predecessor 1106 acknowledges successor 1104 as the proxy server in an UpdateAns command (message 1134).

Thereafter, joining peer 1102 initiates checks for connectivity by sending messages with a status of connectivity of joining peer 1102 through an UpdateReq command to the proxy server which is successor 1104 (message 1136). Predecessor 1106 initiates checks for connectivity by sending messages with a status of connectivity of predecessor 1106 through an UpdateReq command to the proxy server which is successor 1104 (message 1138).

Figure 12:
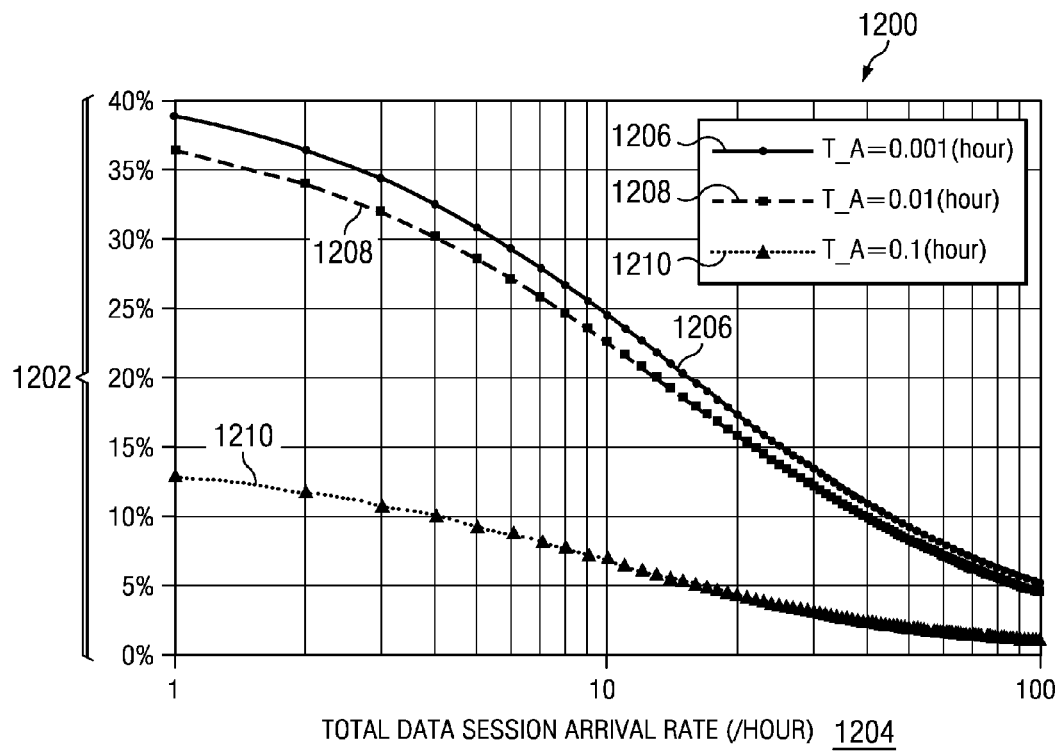
FIG. 12 is an illustration of a chart of test results depicted in accordance with an advantageous embodiment.

Turning now to FIG. 12, an illustration of a chart of test results is depicted in accordance with an advantageous embodiment. Chart 1200 may indicate the signaling cost reduction percentage 1202 per total data session arrival rate per hour with certain activity timers. Chart 1200 may provide results when using a peer-to-peer network, such as peer-to-peer network 600 of FIG. 6. Chart 1200 comprises two sets of data, signaling cost reduction percentage 1202 and total data session arrival rate per hour 1204.

Signaling cost reduction percentage 1202, which is on the y-axis, is the percentage reduction in signaling cost. Signaling cost may be proportionally related to battery power consumption. Data session arrival rate per hour 1204, which is on the x-axis, is the number of data sessions a mobile device has per hour. As the data session arrival rate per hour 1204 increases, the signaling cost reduction percentage 1202 decreases because the mobile device takes advantage of periods of activity. Furthermore, the smaller the activity timer (T_A) value the more savings in signaling cost reduction percentage 1202. The activity timer is the duration that a mobile device with no data activity will stay in a connected-inactive state before moving into an idle state.

Chart 1200 has three different sets of results. The first set 1206 is with the activity timer set to a thousandth of an hour. The second set 1208 is with the activity timer set to a hundredth of an hour. The third set 1210 is with the activity timer set to a tenth of an hour.

Figure 13:
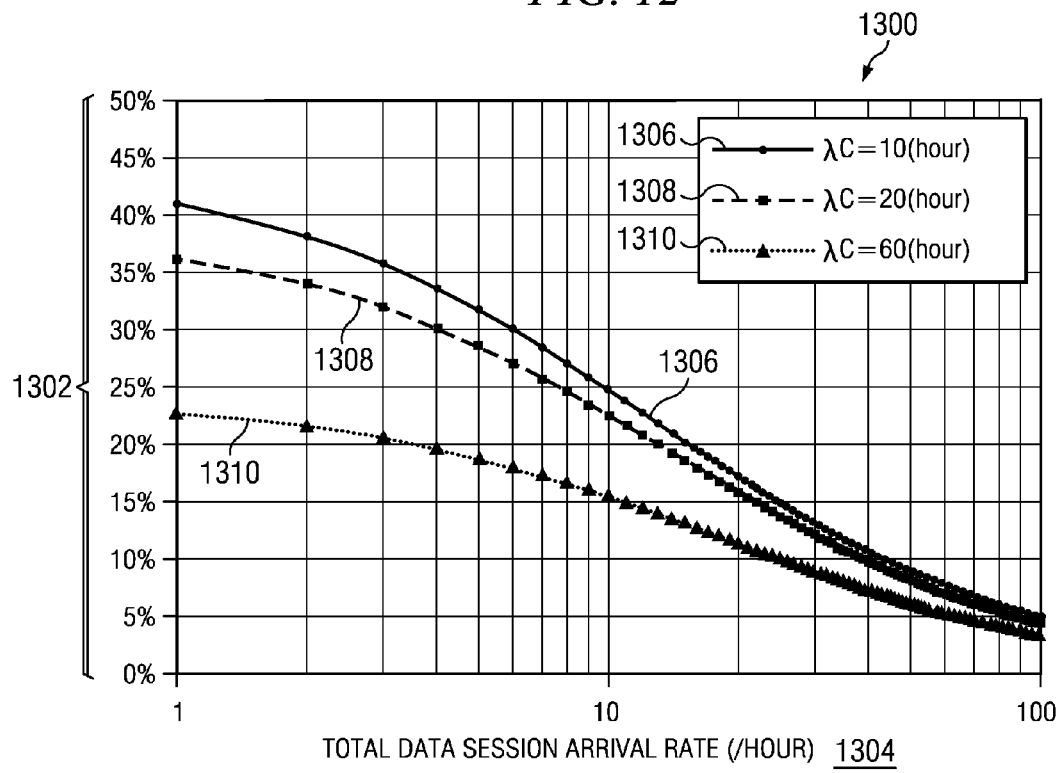
FIG. 13 is an illustration of a chart of test results depicted in accordance with an advantageous embodiment.

Turning now to FIG. 13, an illustration of a chart of test results is depicted in accordance with an advantageous embodiment. Chart 1300 may indicate the signaling cost reduction percentage 1302 per total data session arrival rate per hour with certain activity timers. Chart 1300 may provide results when using a peer-to-peer network, such as peer-to-peer network 600 of FIG. 6. Chart 1300 comprises two sets of data, signaling cost reduction percentage 1302 and total data session arrival rate per hour 1304.

Signaling cost reduction percentage 1302, which is on the y-axis, is the percentage reduction in signaling cost. Signaling cost may be proportionally related to battery power consumption. Data session arrival rate per hour 1304, which is on the x-axis, is the number of data sessions a mobile device has per hour. As the data session arrival rate per hour 1304 increases, the signaling cost reduction percentage 1302 decreases because the mobile device takes advantage of periods of activity. Furthermore, the higher the average cell crossing rate ($\lambda c$), the lower signaling cost reduction percentage 1302. Average cell crossing rate is the number of times the mobile device moves to a different cell generating more signaling for handoff and paging area updates if the mobile device crosses the boundary of the paging area. Average paging area crossing rate is proportionally related to average cell crossing rate.

Chart 1300 has three different sets of results. The first set 1306 is with ten cell crossings per hour. The second set 1308 is with twenty cell crossings per hour. The third set 1310 is with sixty cell crossings per hour.

Figure 14:
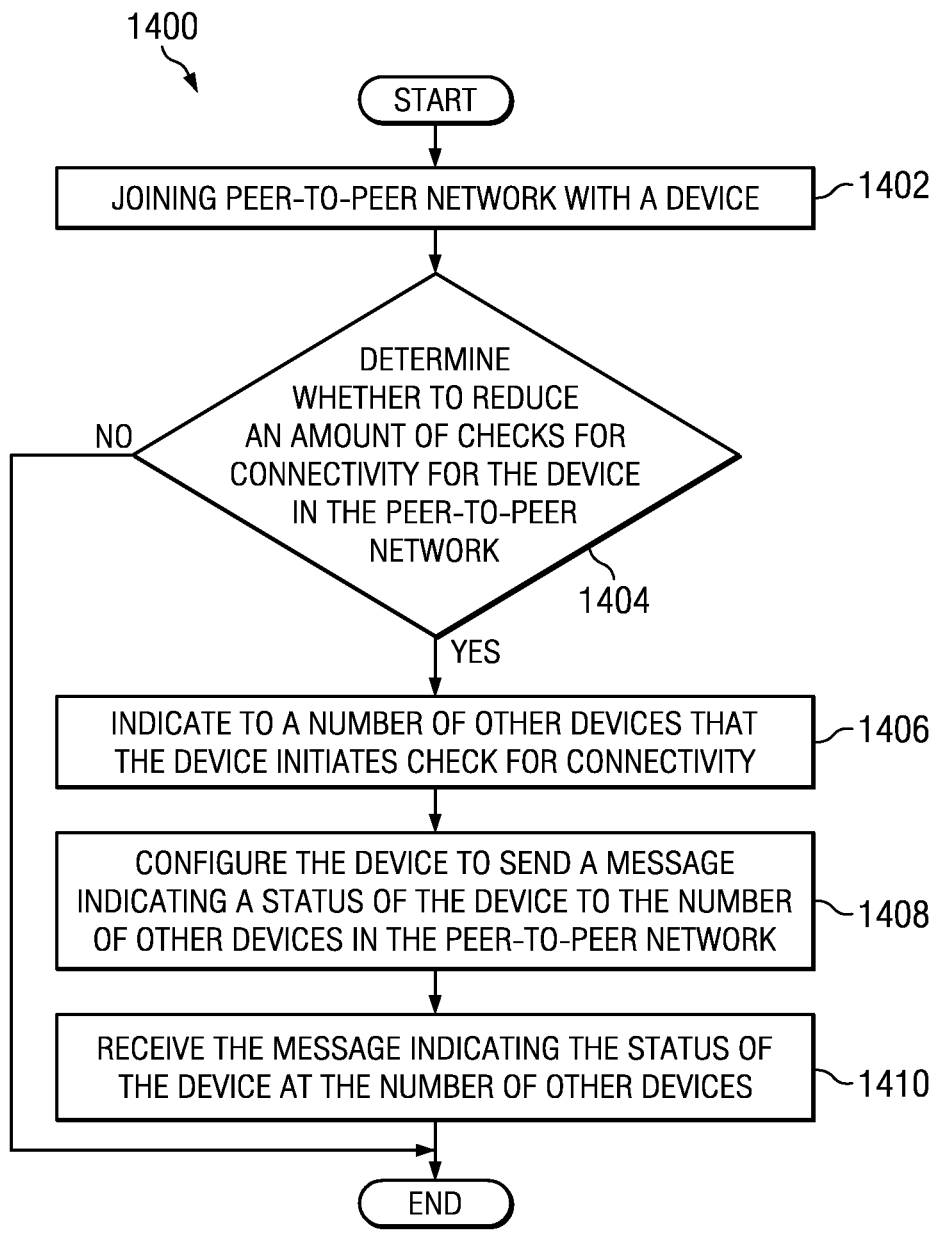
FIG. 14 is a flowchart of a process for managing requests in a peer-to-peer network in accordance with an illustrative embodiment.

The flowchart of FIG. 14 illustrates a process for managing requests in a peer-to-peer network in accordance with an illustrative embodiment. Method 1400 may be implemented, for example, in user equipment, such as user equipment 300 as shown in FIG. 3. Method 1400 begins by joining a peer-to-peer network with a device (step 1402). The device may be a mobile device. A determination is made whether to reduce an amount of checks for connectivity for the device in the peer-to-peer network (step 1404). If it is determined not to reduce an amount of checks for connectivity for the device in the peer-to-peer network, the process terminates. If it is determined to reduce an amount of checks for connectivity for the device in the peer-to-peer network, the process indicates to a number of other devices that the device initiates the checks for connectivity (step 1406). When more than one device is mobile, more than one device may initiate the checks for connectivity. When this situation exists, the device and the number of other devices initiate checks for connectivity in an order based on a policy. The status of the device comprises a connectivity of the device. The process configures the device to send a message indicating a status of the device to the number of other devices in the peer-to-peer network (step 1408). The number of other devices receives the message indicating the status of the device (step 1410). Thereafter, the process terminates.

Figure 15:
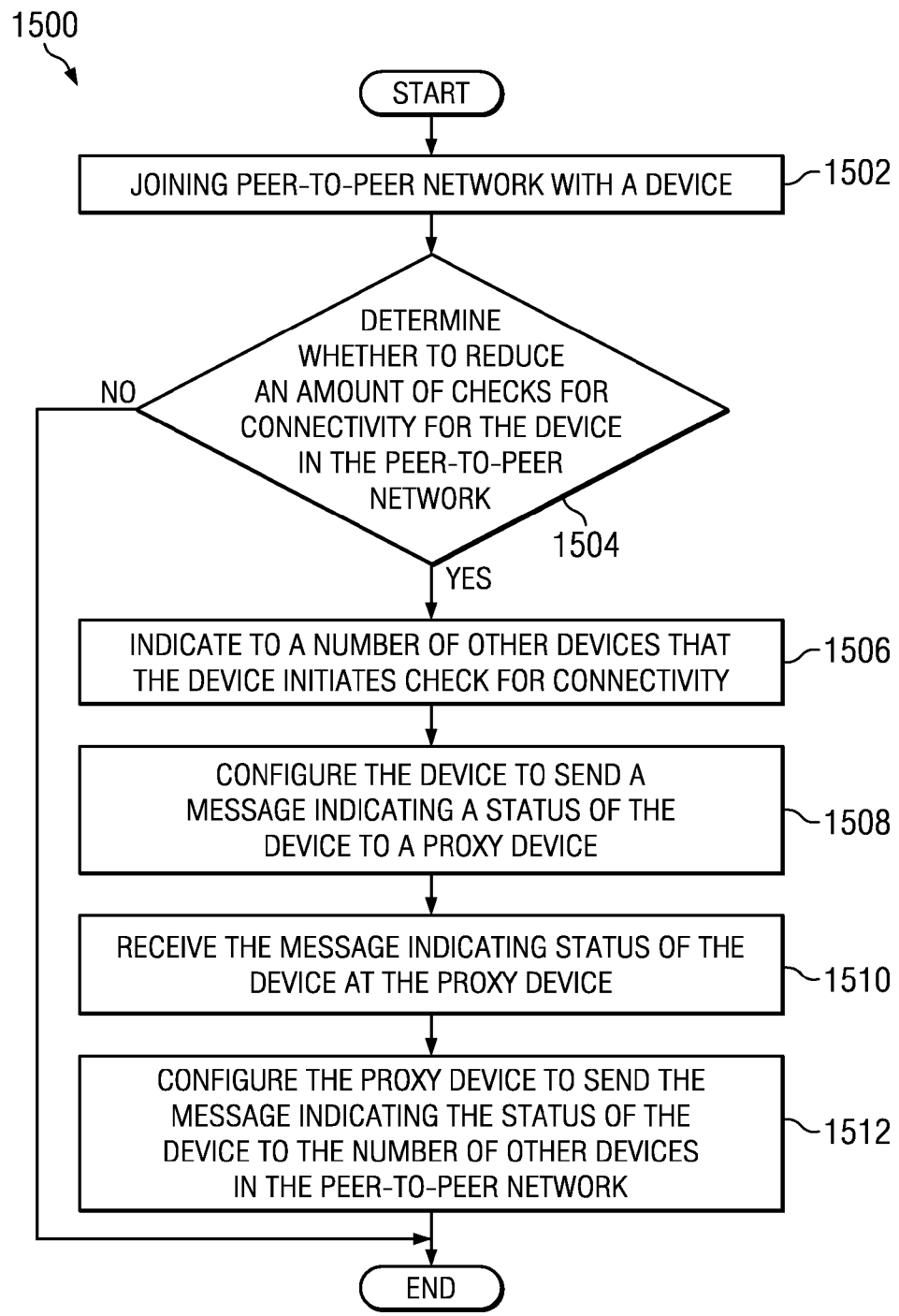
FIG. 15 is a flowchart of a process for managing requests in a peer-to-peer network in accordance with an illustrative embodiment.

The flowchart of FIG. 15 illustrates a process for managing requests in a peer-to-peer network in accordance with an illustrative embodiment. Method 1500 may be implemented, for example, in user equipment, such as user equipment 300 as shown in FIG. 3. Method 1500 begins by joining a peer-to-peer network with a device (step 1502). The device may be a mobile device. A determination is made whether to reduce an amount of checks for connectivity for the device in the peer-to-peer network (step 1504). If it is determined not to reduce an amount of checks for connectivity for the device in the peer-to-peer network the process terminates. If it is determined to reduce an amount of checks for connectivity for the device in the peer-to-peer network, the process indicates to a number of other devices that the device initiates the checks for connectivity (step 1506). When more than one device is mobile, more than one device may initiate the checks for connectivity. When this situation exists, the device and the number of other devices initiate checks for connectivity in an order based on a policy. The status of the device comprises a connectivity of the device. The process configures the device to send a message indicating a status of the device to a proxy device (step 1508). The proxy device receives the message indicating the status of the device (step 1510). The process configures the proxy device to send the message indicating the status of the device to the number of other devices in the peer-to-peer network (step 1512). Thereafter, the process terminates.

Figure 16:
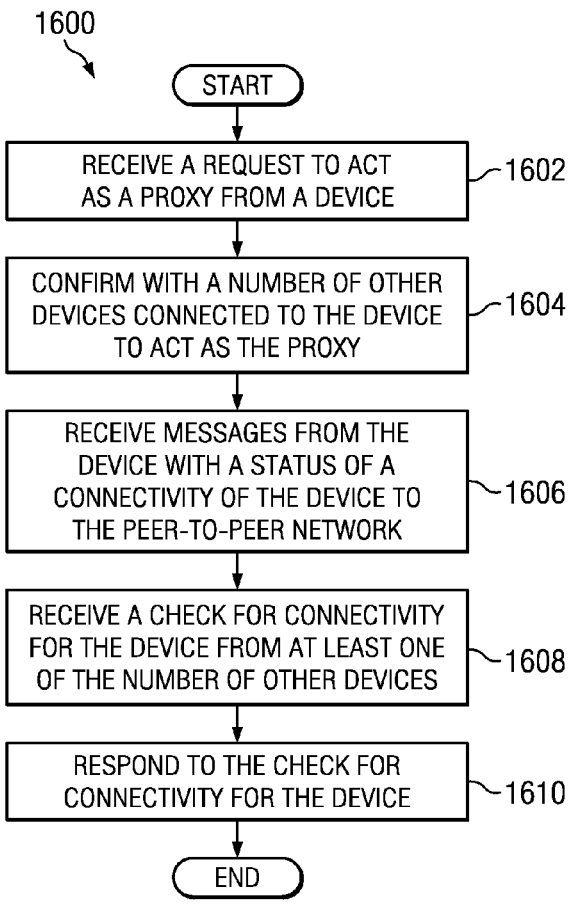
FIG. 16 is a flowchart of a process for a proxy collecting the status of a device in accordance with an illustrative embodiment.

The flowchart of FIG. 16 illustrates a process for a proxy collecting the status of a device in accordance with an illustrative embodiment. Method 1600 may be implemented, for example, in user equipment, such as user equipment 300 as shown in FIG. 3. Method 1600 begins by receiving a request to act as a proxy from a device (step 1602). The proxy then confirms with a number of other devices connected to the device to act as the proxy (step 1604). The proxy receives messages from the device with a status of a connectivity of the device to the peer-to-peer network (step 1606). The proxy receives a check for connectivity for the device from at least one of the number of other devices (step 1608). The proxy responds to the check for connectivity for the device to the at least one of the number of other devices (step 1610). Thereafter, the process terminates.

Figure 17:
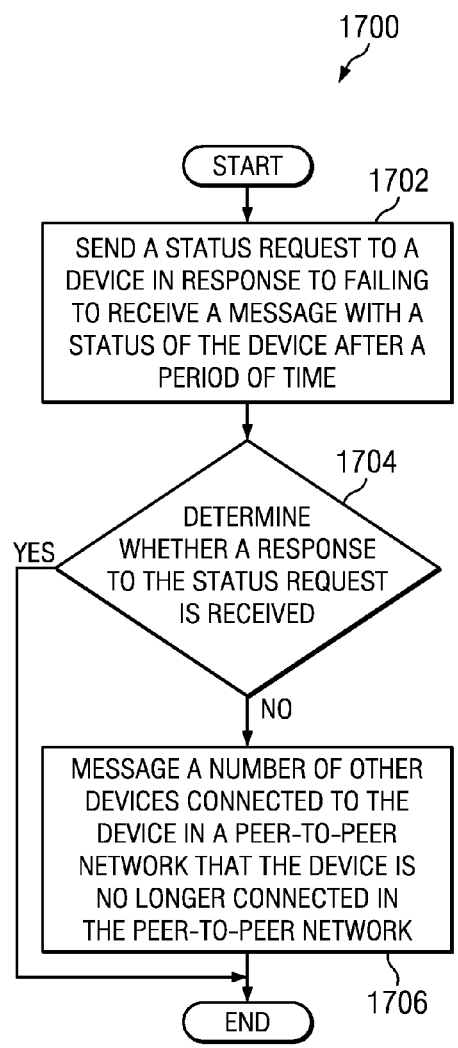
FIG. 17 is a flowchart of a process for a proxy checking the status of a device not in contact with the proxy in accordance with an illustrative embodiment.

The flowchart of FIG. 17 illustrates a process for a proxy checking the status of a device not in contact with the proxy in accordance with an illustrative embodiment. Method 1700 may be implemented, for example, in user equipment, such as user equipment 300 as shown in FIG. 3. Method 1700 begins by sending a status request to a device in response to failing to receive a message with a status of the device after a period of time (step 1702). The period of time may be set to any desirable time. The proxy receives messages from the device if the device was mobile. The messages contain the status of connectivity of the device. A determination is made whether a response to the status request is received (step 1704). If it is determined a response to the status request is received, the process terminates. If it is determined a response to the status request is not received, the process messages a number of other devices connected to the device in a peer-to-peer network that the device is no longer connected in the peer-to-peer network (step 1706). Thereafter, the process terminates.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The embodiments disclosed herein provide a system, apparatus, and method for managing requests in a peer-to-peer network. A processor determines whether to reduce an amount of checks for connectivity for the device in the peer-to-peer network in response to a device being in the peer-to-peer network. The processor configures the device to send a message indicating a status of the device to a number of other devices in the peer-to-peer network without receiving a request for the status of the device in response to a determination to reduce the amount of checks for connectivity for the device in the peer-to-peer network.

The different embodiments disclosed herein recognize and take into account a number of different considerations. For example, the disclosed embodiments recognize and take into account that current peer-to-peer networks send messages checking the connectivity of many devices. For example, a device in current peer-to-peer networks will periodically check the connectivity of other devices that are connected with the device. One or more of the other devices may be a mobile device. The cell location of the mobile device may not be known if the mobile device is in an idle state at the time of connectivity checking. When the cell is unknown, multiple pages are sent to all cells within a paging area. Paging multiple cells creates signal loading on the network. The more mobile peers and the larger paging area size, the more signal loading. Additionally, the mobile device is in an idle state and the idle state is interrupted to respond to the connectivity check. Responding to multiple connectivity checks from devices may decrease battery power levels. The different embodiments provide a message management system for decreasing the number of checks for connectivity sent across the network and to each mobile device by allowing the mobile devices to send most of their status messages while in an active state.

The description of the different illustrative embodiments has been presented for purposes of illustration and description, and is not intended to be exhaustive or to limit the embodiments to the form disclosed. Many modifications and variations will be apparent to those of ordinary skill in the art. In the illustrative examples, the user equipment has been described with respect to a mobile phone. The different illustrative embodiments may be applied to other types of platforms in addition to, or in place of, the ones described, such as a mobile platform, a stationary platform, a land-based structure, an aquatic-based structure, a space-based structure, a smart phone, a personal digital assistant, a desktop computer, a server computer, a set-top box, a game console, a workstation, and any other suitable platform. A component may be included in a platform in a number of different ways. For example, the component may be located inside the platform, outside of the platform, formed as part of the platform, mechanically secured to the platform, or otherwise associated with the platform.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing connectivity in a peer-to-peer network, the method comprising:
   responsive to a device being in the peer-to-peer network, determining whether to reduce an amount of checks for connectivity for the device in the peer-to-peer network;
   responsive to a determination to reduce the amount of the checks for connectivity for the device in the peer-to-peer network, initiating, at the device, an attachment command to a number of other devices in the peer-to-peer network;
   configuring the device to send a message indicating a status of the device to the number of other devices in the peer-to-peer network without receiving a request for the status of the device;
   determining whether a loss of connectivity has occurred, wherein the loss of connectivity occurs when the message from the device is not received within a desired period of time; and responsive to a determination that the loss of connectivity has occurred, sending a loss message to the number of other devices indicating that the device is no longer connected to the peer-to-peer network,
wherein initiating the attachment command is based on a policy, the policy including instructions for allowing the device or one of the number of other devices to initiate the checks for connectivity in an order if the device or the one of the number of other devices is mobile and battery-powered.

2. The method of claim 1, wherein the device is a mobile and battery-powered device.

3. The method of claim 1, wherein the number of other devices are fixed devices or mobile and battery-powered devices.

4. The method of claim 1, wherein the step of configuring the device to send the message indicating the status of the device to the number of other devices in the peer-to-peer network without receiving the request for the status of the device comprises:
receiving an acknowledgement to the attachment command from at least one of the number of other devices;
selecting a proxy device;
notifying the proxy device that the at least one of the number of other devices also initiates the checks for connectivity;
configuring the device to send the message indicating the status of the device to the proxy device;
configuring the proxy device to record the status of the device; and
responsive to determining a loss of connectivity of the device, configuring the proxy device to send a loss message indicating the loss of connectivity of the device to the number of other devices in the peer-to-peer network.

5. The method of claim 4, comprising:
determining whether to reduce the amount of the checks for connectivity for the number of other devices in the peer-to-peer network, wherein configuring the device to send the message indicating the status of the device to the proxy device is in response to a determination to reduce the amount of the checks for connectivity for the number of other devices in the peer-to-peer network.

6. The method of claim 1, further comprises:
receiving an acknowledgement to the attachment command from at least one of the number of other devices.

7. The method of claim 1, wherein the order is the device and the number of other devices to take turns to initiate the checks for connectivity.

8. The method of claim 1, wherein the order is where the device and the number of other devices decide for each check for connectivity which device initiates the check for connectivity.

9. The method of claim 1, wherein the status comprises a connectivity of the device.

10. A device comprising:
an antenna;
a transmitter configured to send first data using the antenna;
a receiver configured to receive second data using the antenna; and
a processor unit, operatively coupled to a memory, connected to the transmitter and the receiver, wherein the processor unit is configured:
to initiate an attachment command to a number of other devices in the peer-to-peer network;
to send a message indicating a status of the device to the number of other devices in the peer-to-peer network without receiving a request for the status of the device;
determine whether a loss of connectivity has occurred, wherein the loss of connectivity occurs when the message from the device is not received within a desired period of time; and
send a loss message to the number of other devices indicating that the device is no longer connected to the peer-to-peer network in response to a determination that the loss of connectivity has occurred,
wherein initiating the attachment command is based on a policy, the policy including instructions for allowing the device or one of the number of other devices to initiate the checks for connectivity in an order if the device or the one of the number of other devices is mobile and battery-powered.

11. The device of claim 10, wherein the processor unit is further configured to:
receive an acknowledgement to the attachment command from at least one of the number of other devices; and
select a proxy device.

12. A network element in a peer-to-peer network comprising a processor unit operatively coupled to a memory for executing instructions stored in the memory, wherein the processor unit is configured:
to receive an attachment command from a device in the peer-to-peer network;
to forward the attachment command to a number of other devices in the peer-to-peer network;
to receive identification from the device or other devices in the peer-to-peer network indicating a mobile device; and
to determine whether to reduce an amount of checks for connectivity in the peer-to-peer network based on the identification indicating the mobile device, wherein reduction of the amount of checks for connectivity does not involve a request for a status of the device,
wherein the received attachment command is based on a policy transmitted by the network element, the policy including instructions for allowing the device or one of the number of other devices to initiate the checks for connectivity in an order if the device or the one of the number of other devices is mobile and battery-powered.

13. The method of claim 1, wherein the determining whether to reduce an amount of checks for connectivity for the device in the peer-to-peer network is based on reception of identification from the device indicating the device is a mobile device.

* * * * *

UNITED STATES PATENT AND TRADEMARK OFFICE
CERTIFICATE OF CORRECTION

PATENT NO. : 8,620,986 B2  
APPLICATION NO. : 12/731138  
DATED : December 31, 2013  
INVENTOR(S) : Wei Wu et al.

It is certified that error appears in the above-identified patent and that said Letters Patent is hereby corrected as shown below:

In the Specification

Column 12, line 19 should properly be read as:

"…from node 512 to node 508 travels through other nodes to get…"

Signed and Sealed this  
Eighth Day of July, 2014

Michelle K. Lee  
*Deputy Director of the United States Patent and Trademark Office*